(12) United States Patent
Poukka et al.

(10) Patent No.: US 12,479,876 B2
(45) Date of Patent: Nov. 25, 2025

(54) METHOD OF REMOVING VOLATILE COMPOUNDS FROM A LIGNIN-CONTAINING MATERIAL, USE OF A DISTILLATION METHOD, AND A LIGNIN-CONTAINING MATERIAL

(71) Applicant: Andritz Oy, Helsinki (FI)

(72) Inventors: Outi Poukka, Metsä (FI); Katja Salmenkivi, Metsä (FI); Lauri Pehu-Lehtonen, Helsinki (FI); Pauliina Sjögård, Helsinki (FI); Tarja Tamminen, Espoo (FI); Tiina Liitiä, Espoo (FI); Taina Ohra-aho, Espoo (FI)

(73) Assignee: Andritz Oy, Helsinki (FI)

( * ) Notice: Subject to any disclaimer, the term of this patent is extended or adjusted under 35 U.S.C. 154(b) by 747 days.

(21) Appl. No.: 17/786,003

(22) PCT Filed: Dec. 18, 2020

(86) PCT No.: PCT/FI2020/050858
§ 371 (c)(1),
(2) Date: Jun. 16, 2022

(87) PCT Pub. No.: WO2021/123507
PCT Pub. Date: Jun. 24, 2021

(65) Prior Publication Data
US 2023/0023359 A1    Jan. 26, 2023

(30) Foreign Application Priority Data
Dec. 20, 2019 (FI) ..................................... 20196119

(51) Int. Cl.
*C07G 1/00* (2011.01)
*B01D 3/14* (2006.01)
(Continued)

(52) U.S. Cl.
CPC ................. *C07G 1/00* (2013.01); *B01D 3/14* (2013.01); *B01D 3/38* (2013.01); *B01D 5/006* (2013.01);
(Continued)

(58) Field of Classification Search
CPC ... C07G 1/00; B01D 3/14; B01D 3/38; B01D 5/006; D21C 11/0007; D21C 11/08
(Continued)

(56) References Cited

U.S. PATENT DOCUMENTS 8,853,478 B2    10/2014    Machhammer et al.
2003/0056910 A1    3/2003    Mullen et al.
(Continued)

FOREIGN PATENT DOCUMENTS

DE    1020130018678 A1    7/2013
DE    102014106841 B3    5/2015
(Continued)

OTHER PUBLICATIONS

Brebu et al: Thermal degradation of lignin—A Review. Cellulose Chemistry and Technology, 2010, vol. 44, No. 9, pp. 353-363.
(Continued)

*Primary Examiner* — David T Karst
(74) *Attorney, Agent, or Firm* — Laine IP Oy

(57) ABSTRACT

According to an example aspect of the present invention, there is provided a method of removing volatile compounds from a lignin-containing material, the method comprising: providing a material comprising lignin and volatile compounds; treating the material by a distillation method in order to vaporize at least a part of the volatile compounds.

18 Claims, 8 Drawing Sheets

(51) Int. Cl.
  *B01D 3/38*   (2006.01)
  *B01D 5/00*   (2006.01)
  *D21C 11/00*  (2006.01)
  *D21C 11/08*  (2006.01)

(52) U.S. Cl.
  CPC .......... *D21C 11/0007* (2013.01); *D21C 11/08* (2013.01)

(58) Field of Classification Search
  USPC ........................................................ 530/500
  See application file for complete search history.

(56) References Cited

U.S. PATENT DOCUMENTS

| | | | |
|---|---|---|---|
| 2008/0214796 | A1 | 9/2008 | Tomani et al. |
| 2010/0190973 | A1* | 7/2010 | Srivastava ............... C13K 1/02 422/187 |
| 2011/0275869 | A1 | 11/2011 | Prochazka et al. |
| 2014/0187760 | A1 | 7/2014 | Pu |
| 2016/0177040 | A1 | 6/2016 | Tomani et al. |
| 2019/0292329 | A1 | 9/2019 | Deandrea et al. |
| 2022/0135408 | A1 | 5/2022 | Wittmann et al. |

FOREIGN PATENT DOCUMENTS

| | | |
|---|---|---|
| EP | 1424435 A2 | 6/2004 |
| JP | S5133765 A | 3/1976 |
| JP | H06228896 A | 8/1994 |
| JP | 2007319842 A | 12/2007 |
| RU | 2338769 C1 | 11/2008 |
| RU | 2409539 C1 | 1/2011 |
| WO | WO2006031175 A1 | 3/2006 |
| WO | WO2008057031 A1 | 5/2008 |
| WO | WO2012161865 A1 | 11/2012 |
| WO | WO2013070130 A1 | 5/2013 |
| WO | WO2014116150 A1 | 7/2014 |
| WO | WO2017222455 A1 | 12/2017 |
| WO | WO2018004427 A1 | 1/2018 |
| WO | WO2019068918 A1 | 4/2019 |
| WO | WO2020050767 A1 | 3/2020 |

OTHER PUBLICATIONS

Wikipedia: Steam distillation. Retrieved Jun. 8, 2023 from https://en.wikipedia.org/wiki/Steam_distillation.
Evaporator Issues and Technology, Valmet, Oct. 31, 2018.
Jiang et al: Effect of the Temperature on the composition of Lignin Pyrolysis Products. Energy & Fuels, 2010, vol. 24, pp. 4470-4475.
Steam Stripping Odorous Substances from Kraft Effluent Streams. Office of Research and Monitoring U.S. Environmental Protection Agency, 1973.
The next generation LignoBoost—tailor-maid lignin production for different lignin bioproduct markets. Valmet, May 26, 2017.
Wallmo et al: The next generation LignoBoost—tailor-maid lignin production for different lignin bioproduct markets. J-FOR, 2018, vol. 7, No. 2.

* cited by examiner

METHOD OF REMOVING VOLATILE COMPOUNDS FROM A LIGNIN-CONTAINING MATERIAL, USE OF A DISTILLATION METHOD, AND A LIGNIN-CONTAINING MATERIAL

FIELD

The present invention relates to a method of removing volatile compounds from lignin, and more particularly to a method of removing odours from a lignin-comprising material originating from pulp production.

BACKGROUND

Lignin is a wood component, a polymer that brings rigidity and strength to the cell walls of wood. The molecular structure of lignin is a cross-linked phenolic polymer. Approximately 20 to 30% of wood is lignin.

The raw material of papermaking, lignocellulose, comprises large amounts of lignin. Lignin must be removed as it weakens the paper structure, and also due to its colour.

A pulp mill produces pulp from wood chips. The obtained pulp can be later used in paper or paperboard manufacturing. A typical pulp mill is a combination of many different units and operations for actually manufacturing pulp, and also for producing valuable side streams.

The first step of a pulping process is the cooking (the main delignification step) of wood chips in a digester in an alkaline environment at a high temperature. The cooking liquor, the so-called white liquor mainly consists of NaOH and $Na_2S$. During this delignification step, fibres are released and lignin extracted. The white liquor reacts with the wood chips during the cooking process through delignification into black liquor. The black liquor is evaporated in an evaporation plant to recover sodium and sulphate chemicals.

Lignin may be separated from the black liquor by acidification and washing, then returning lignin filtrates back to the evaporation.

Typically, lignin is removed from black liquor at 35 to 45% dry solids content and pH of 12 to 13. The pH of black liquor is decreased to a pH value in the range of 9 to 10.5 with carbon dioxide or sulphuric acid or both to precipitate the lignin. When the pH of black liquor is lowered below 11, sulphur-rich lignin precipitates and forms small particles. The obtained slurry is filtrated to separate the precipitated lignin. Next, a dilution wash is carried out with sulphuric acid to remove impurities from the filtrated precipitated lignin. The obtained slurry is again filtrated to dewater it. The moist lignin cake can be dried.

Traditionally lignin has been burnt in the recovery boiler to generate steam and electricity. This is practically taking place in all Kraft pulp mills. Separated lignin could also be used as a fuel in a similar way. Lignin may for example function as a biofuel that replaces fossil fuels used in a lime kiln. Here, the odour of lignin has however no significance. Lignin can also be used in a plenitude of different applications. In these, use of lignin is restricted by its smell. Examples of such applications include adhesives, resins, coatings, plastic materials, polymer composites, polyurethanes, carbon fibres, activated carbons and as additives in various materials.

The applicability of lignin, particularly in consumer products, is restricted because of its bad smell. Typically, the most volatile compounds in a lignin material cause its odour.

The odour is due to several chemical compounds, of which the most significant are guaiacol (2-methoxy phenol), dimethyl sulphide, dimethyl disulphide and dimethyl trisulphide. Among these, the most difficult one to remove is guaiacol. The sulphur compounds present in the lignin material are not only odorous but also harmful to human health.

It is known that the odour threshold values for these compounds are approximately the following: 0.003-0.021 ppm (mg/kg) for guaiacol in water; 0.001 ppm (mg/kg) for DMS in air; 0.005 ppm (mg/kg) for DMDS in water and 0.0076 ppm (mg/kg) in air; and 0.0002 ppm (mg/kg) for DMTS in air.

WO 2018004427 A1 discloses a method of producing lignin with reduced amount of odorous substances comprising the steps of: providing a solid phase lignin containing starting material to be contacted with a water solution comprising alcohol; dissolving at least guaiacol and ethylguaiacol content from the lignin into the water solution, and draining off the water solution with its content of guaiacol and ethylguaiacol; obtaining a lignin material with a reduced content guaiacol and ethylguaiacol.

Thus there is a need to remove odorous compounds from lignin, preferably below their odour threshold values.

There is a need to widen the applicability of lignin to applications such as adhesives, resins, coatings, plastic materials, polymer composites, polyurethanes, carbon fibres, activated carbons and as additives in various materials.

There is a further need to develop an effective process for the separation of guaiacol from lignin.

There is a further need to widen the applicability of lignin in indoor housing applications, automotive applications and consumer products by removing such odorous compounds that easily vaporize and/or are the most disturbing to humans.

Embodiments of the present invention are intended to overcome at least some of the disadvantages in the prior art.

SUMMARY OF THE INVENTION

The invention is defined by the features of the independent claims. Some specific embodiments are defined in the dependent claims.

According to a first aspect of the present invention, there is provided a method of removing volatile compounds from a lignin-containing material, the method comprising: providing a starting material comprising lignin and volatile compounds; treating the material by a distillation method in order to vaporize at least a part of the volatile compounds.

Various embodiments of the first aspect may comprise at least one feature from the following bulleted list:

- Said treating comprises exposing the material to an action of steam in order to vaporize at least a part of the volatile compounds.
- The volatile compounds comprise volatile odorous compounds.
- The material is in the form of an aqueous suspension.
- Said treating step comprises steam stripping.
- The distillation method is a steam stripping method or a vacuum distillation method.
- Said volatile compounds comprise sulphides, such as dimethyl sulphide, dimethyl disulphide and/or dimethyl tri sulphide, and/or guaiacol.
- The material originates from a pulp production process and comprises lignin that has been precipitated from black liquor.

The material originates from a pulp production process and comprises lignin that has been precipitated from black liquor and thereafter acid washed.

The starting material comprises at least 100 mg/kg guaiacol of the dry matter, for example at least 1 000 mg/kg guaiacol of the dry matter.

The starting material comprises at least 1 mg/kg sulphides of the dry matter.

Said method comprises exposing the material to an action of steam at a temperature from 50 to 120° C. for at least 10 minutes in order to vaporize at least a part of the odorous compounds.

Said method comprises: before or during the treating step, forming an aqueous suspension or a moist paste of said material.

Said method comprises: after or during the treating step, condensing the vaporized odorous compounds.

According to a second aspect of the present invention, there is provided use of steam stripping or vacuum distillation for removing volatile compounds, such as guaiacol and reduced sulphur compounds, from a lignin-containing material.

Various embodiments of the second aspect may comprise at least one feature from the following bulleted list:

Said volatile compounds comprise sulphides, such as dimethyl sulphide, dimethyl disulphide and/or dimethyl tri sulphide, and/or guaiacol.

The lignin-containing material originates from a pulp production process.

According to a third aspect of the present invention, there is provided a lignin-containing material obtained by the method according to the first aspect.

Advantages

The present invention makes it possible to reduce the amount of odorous compounds in lignin without modifying lignin structure.

The present invention widens significantly the potential application areas of lignin to such applications in which the end product needs to be free from volatile compounds, particularly odour-free. Examples include adhesives, resins, coatings, plastic materials, polymer composites, polyurethanes, carbon fibres, activated carbons and as additives in various materials.

The present method can be easily integrated to lignin separation processes that are currently in use in pulping processes.

The present method enables valorisation of lignin-containing streams from Kraft pulping processes or other industrial processes producing lignin-containing streams comprising volatile compounds.

In the present method, it is not necessary to use any chemicals in order to remove the odorous compounds from lignin. Thus the present method is cost-effective and interesting from the environmental point of view as no additional chemicals are needed and no additional waste is generated in at least some embodiments.

The present invention enables removal of odour from lignin without use of additional chemicals and without modifying lignin properties.

EMBODIMENTS

Definitions

In the present context, the term "steam stripping" comprises any steam treatment method in which a material is exposed to an action of steam in order to separate (vaporize) volatile compounds from it and to recover the material in purified form. The terms "steam stripping" and "steam distillation" can be used interchangeably.

In the present context, the term "steam" comprises vaporized water optionally mixed with other gases and/or condensed water mist or water droplets. Steam may be in a heated or non-heated form.

In the present invention, it has been surprisingly observed that undesired volatile compounds can be removed from a lignin-containing material by means of a distillation method, such as steam stripping or vacuum distillation. Preferably, steam stripping is used.

Figure 1:
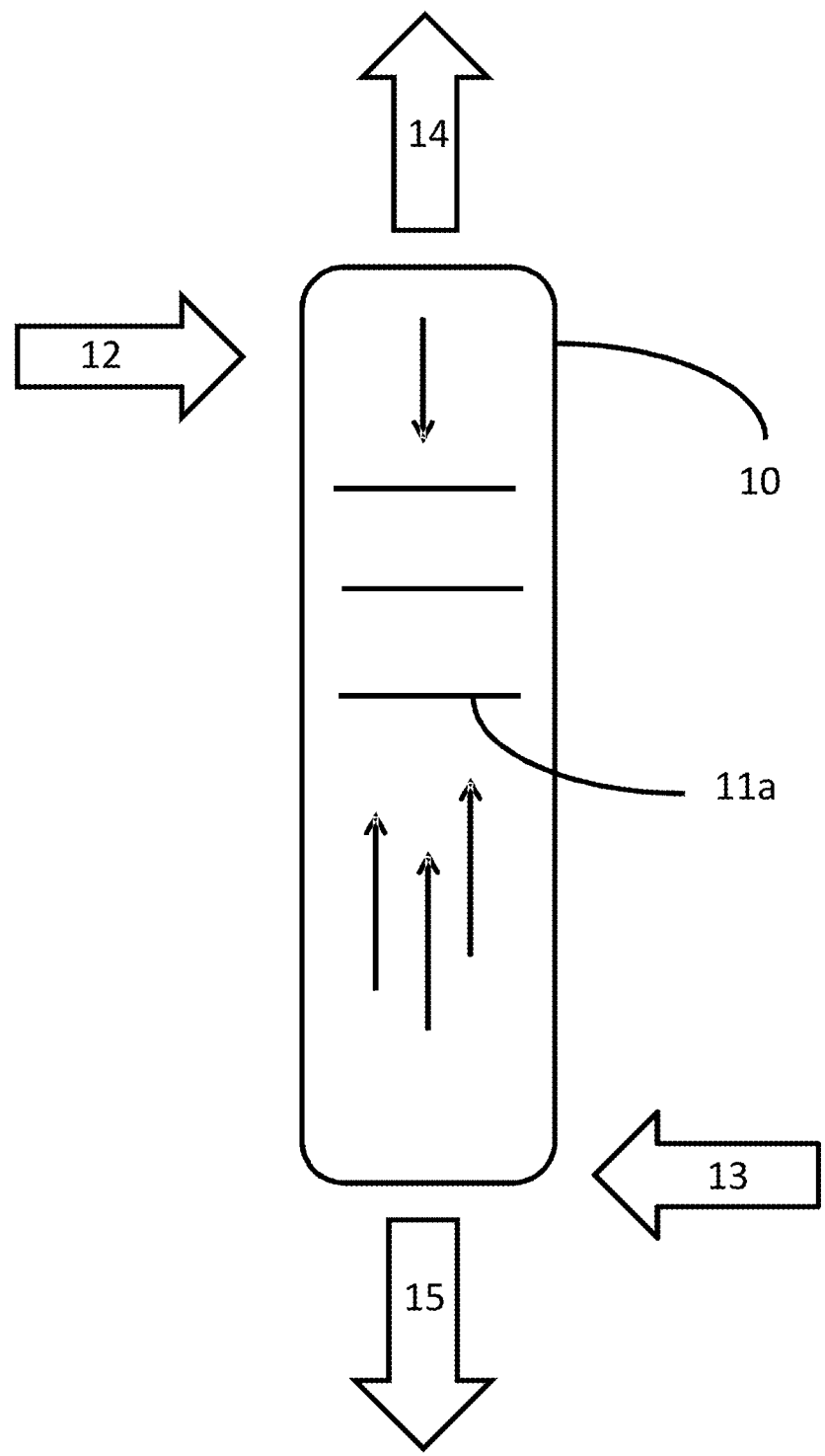
FIG. 1 illustrates an example apparatus capable of supporting at least some embodiments of the present invention.

FIG. 1 illustrates an example apparatus capable of supporting at least some embodiments of the present invention. Suspension of solid odorous lignin, such as solid odorous lignin particles, and water is fed 12 to a steam distillation column 10 via an inlet in the central or upper part of the column. Hot steam is injected 13 via a second inlet in the lower part of the column. The steam inlet is located below the lignin powder inlet. The column may comprise one or more distillation plates, such as the distillation plate 11a. The dirty steam comprising the odorous compounds is output 14 via an outlet in the upper end of the column. The purified lignin is output 15 via an outlet in the lower end of the column.

In preferred embodiments, the starting material comprises at least lignin and volatile compounds, preferably volatile odorous compounds.

In some embodiments, the starting material comprising lignin originates from black liquor produced in a pulping process. After cooking, the black liquor may have been oxidized and/or heat-treated before separating lignin from it.

In a heat-treated black liquor the amount of odorous sulphur compounds may be larger than in a non-heat-treated black liquor.

In an oxidized black liquor the amount of reduced sulphur compounds may be smaller than in non-oxidized black liquor.

In some embodiments, lignin has been precipitated from black liquor by acidifying the black liquor and subsequently filtering and compressing. The obtained primary lignin cake has a pH of 9 to 10.5 and it can be used directly as the starting material in the present method.

In some embodiments, the primary cake is subjected to acid-washing and dewatering, and the resulting acid wash slurry or dilution wash slurry is used as the starting material in the present method. In the slurry the pH is preferably approximately 2 to 2.5. Alternatively, the starting material may be acid washed lignin suspended to water.

In some embodiments, the lignin-containing starting material has a dry solids content of at least 10 wt-%.

In the starting material to be purified, lignin is preferably in the form of solid particles suspended in a liquid medium. In some embodiments, at least 50 wt-% of the lignin is in the form of solid particles suspended in a liquid medium, the remaining part of the lignin being in a dissolved form. In some embodiments, at least 80 wt-% of the lignin is in the form of solid particles suspended in a liquid medium, the remaining part of the lignin being in a dissolved form. The liquid medium is preferably water.

The pH of the lignin suspension is preferably acidic, for example in acid washed lignin the pH is below 4, such as 1.5 to 3. In primary cake lignin suspension the pH is alkaline.

In one embodiment, the lignin-containing starting material is in the form of an aqueous suspension. For example, the suspension may comprise 10 to 30 wt-% lignin.

In one embodiment, the lignin-containing starting material is in the form of a powder.

In some embodiments, the lignin-containing material is exposed to steam at a temperature in the range 50 to 120° C., for example 80 to 110° C., in order to vaporize at least a part of the volatile odorous compounds present in the material. Preferably, the temperature is at least 70° C. to achieve effective removal of volatile compounds.

In embodiments employing vacuum stripping, the temperature may be less than 100° C., preferably less than 70° C. to avoid softening of small lignin molecules.

In some embodiments the steam treatment is carried out by utilizing a steam stripping step. Preferably, the steam treatment is carried out in a steam stripping column into which the lignin-containing starting material is directed in order to be exposed to hot steam.

The steam stripping apparatus typically comprises a column, inlets for a suspension or powder comprising lignin and for hot steam, and outlets for steam-treated lignin and for steam that comprises the odorous compounds removed from the lignin. Preferably, the column comprises one or more lateral distillation plates, for example at least two.

Preferably, the odorous compounds to be removed are selected from the following group: sulphides, such as dimethyl sulphide, dimethyl disulphide and/or dimethyl trisulphide, guaiacol and its derivatives, and any combination thereof.

In some embodiments, the lignin-containing starting material originates from a pulp production process and comprises lignin that has been precipitated from black liquor and, optionally, thereafter acid-washed. Alternatively, any material comprising lignin and/or its derivatives and volatile compounds, for example a lignin material originating from any biorefining process or from a biorefining process other than pulping, may be treated according to a method of the present invention in order to reduce the amount of said volatile compounds, which are preferably sulphurous compounds and/or guaiacol.

The lignin-containing starting material preferably comprises lignin and odorous compounds.

In one embodiment, the lignin-containing starting material comprises at least 180 mg/kg guaiacol or its derivatives.

In one embodiment, the lignin-containing starting material comprises at least 1 mg/kg odorous sulphur compounds.

In one embodiment, the lignin-containing starting material comprises at least 0.5 mg/kg dimethyl sulphide.

In one embodiment, the lignin-containing starting material comprises at least 0.3 mg/kg dimethyl disulphide.

In preferred embodiments, the lignin-containing starting material is exposed to steam at a temperature from 50 to 120° C., such as 80 to 100° C., for at least 2 minutes, for example for 2 to 20 minutes in order to vaporize at least a part of the odorous compounds.

In some embodiments, the method according to the present invention is carried out as a continuous process.

Preferably, the steam treatment or stripping is carried out in atmospheric pressure, whereby the temperature is preferably kept below 100° C.

In one embodiment, the steam treatment or steam stripping is carried out in a reduced pressure, whereby the temperature can be kept below 100° C., for example in the range 40 to 70° C. The advantage of using a reduced pressure and/or a low temperature is that small lignin particles will not melt during the steam treatment.

Preferably, the pressure during the steam treatment is atmospheric pressure. In one embodiment, the pressure is not larger than 1.5 bar, preferably not larger than 1.2 bar.

In some embodiments, the lignin-containing starting material is in the form of a slurry or a suspension or a moist paste. Preferably, the suspension is an aqueous suspension. Alternatively the lignin-containing starting material may be in the form of a powder or granulates or particles.

In some embodiments, the lignin in the starting material is in the form of particles with an average particle size of 0.1 to 10 µm, for example 0.2 to 5 µm.

In one embodiment, the suspension is formed before feeding the lignin-containing starting material to a steam stripping column. In another embodiment, the suspension or paste is formed inside a steam stripping column as a result of exposing the solid lignin-containing starting material to steam.

After the lignin-containing material has been treated by steam, the vaporized odorous compounds are output from the column and thus separated from the treated material. The vaporized odorous compounds can be further directed to a non-condensible gases handling system or an odorous gases handling system in the pulp production process.

The treated lignin is collected or directed out of the column to recover it.

The present invention is particularly effective in removing guaiacol from a lignin-containing material. In one embodiment the lignin-containing end product comprises less than 50 mg/kg, for example less than 10 mg/kg, preferably less than 1 mg/kg guaiacol of the dry matter.

Some embodiments of the present invention enable the use of steam stripping for removing odorous compounds, such as guaiacol and reduced sulphur compounds, from a material comprising lignin.

EXAMPLE

In this example lignin-containing samples originating from various stages in the lignin separation process used in pulp production were treated by a steam stripping method according to an embodiment of the present invention. The samples originated from SW black liquor ("BL"), primary cake lignin ("PL"), acid-washed primary cake lignin ("AL") and heat-treated lignin ("HL"). Water was added to the PL, AL and HL samples before distillation.

Figure 2:
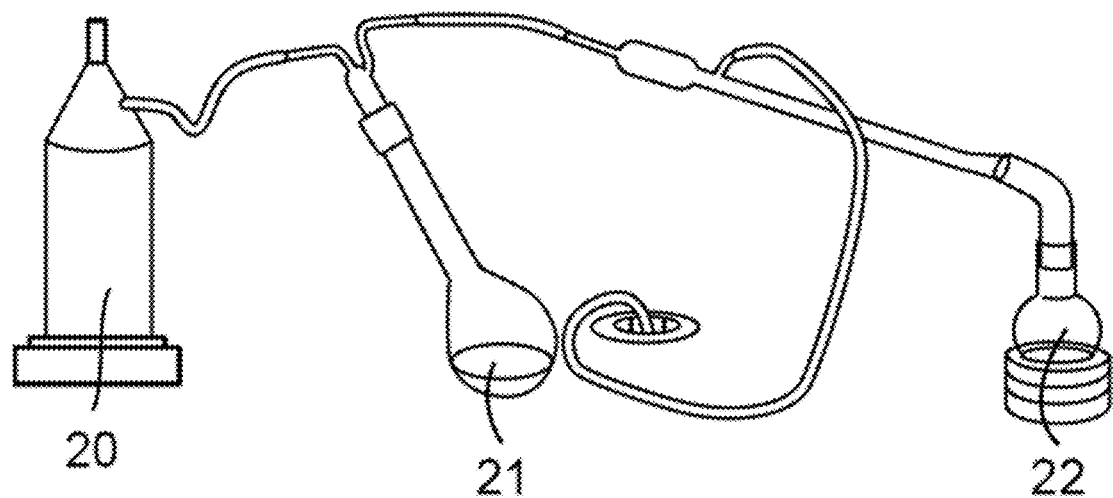
FIG. 2 shows an experimental set-up that was used in the Examples.

The experimental set-up in the steam stripping is shown in FIG. 2. Steam was produced in a boiler (a steam generator) 20 and led to the liquid phase of the sample solution or sample suspension 21. The steam from the head space was led to a condenser, and the distillate 22, which comprised water and organic volatile compounds, was collected.

The steam stripping treatment was performed at atmospheric pressure. Thus, the temperature of the steam was 100° C.

Water was added to the dry lignin samples before the distillation treatment.

The collection time of distillate 1 (D1) varied from 20 to 40 minutes. The collection time of distillate 2 (D2) varied from 20 to 36 minutes. The distillation phase 2 followed directly after the distillation phase 1.

Due to condensation of steam to sample during the steam distillation treatment, the volume of the sample increased.

The steam-treated lignin samples were divided in two parts: one part was dried ("ST-dry") and the other part was not dried, i.e. it was left wet ("ST-wet").

The sample amounts and collection times t are shown in Table 1.

TABLE 1

|  | Sample amount | Addition of water | D1 | t (D1) | D2 | t (D2) | ST | ST-wet | ST-dry |
|---|---|---|---|---|---|---|---|---|---|
| SW black liquor, BL | 192.67 g (dry content 36.7) | no | 157.65 g | 40 min | 152.93 g | 36 min | 308.6 g |  |  |
| Primary cake lignin, PL | 7.09 g | 6.57 g | 94.65 g | 36 min | 98.50 g | 20 min | 78.15 g | 39.08 ml | 2.64 g |
| Acid wasched lignin, AL | 7.13 g | 6.07 g | 95.02 g | n.m. | 90.18 g | n.m. | 110.35 | 55.18 ml | 1.78 g |
| Heat-treated lignin, HL | 7.09 g | 6.53 g | 98.27 g | 20 min | 93.58 g | 29 min | 73.11 g | 36.56 ml | 1.83 g |

The sample codes are shown in Table 2.

TABLE 2

| Samples as such | SW black liquor (BL) | Primary cake lignin (PL) | Acid washed lignin (AL) | Heat-treated lignin (HL) |
|---|---|---|---|---|
| Steam-treated samples (ST) | BL-ST | PL-ST (wet) PL-ST (dry) | AL-ST (wet) AL-ST (dry) | HL-ST (wet) HL-ST (dry) |
| Distillates (D) | BL-D1 BL-D2 | PL-D1 PL-D2 | AL-D1 AL-D2 | HL-D1 HL-D2 |

Analysis of Treated Samples

Two methods were utilized for the determination of odorous, volatile compounds: The lignin samples were analysed by Solid Phase Micro Extraction (SPME) GC/MS. The distillates were analysed by liquid injection followed by GC/MS. The odorous volatile compounds to be followed were: dimethyl sulphide (DMS), dimethyl disulphide (DMDS), dimethyl trisulphide (DMTS) and guaiacol (2-methoxyphenol).

SPME-GC/MS

Figure 3:
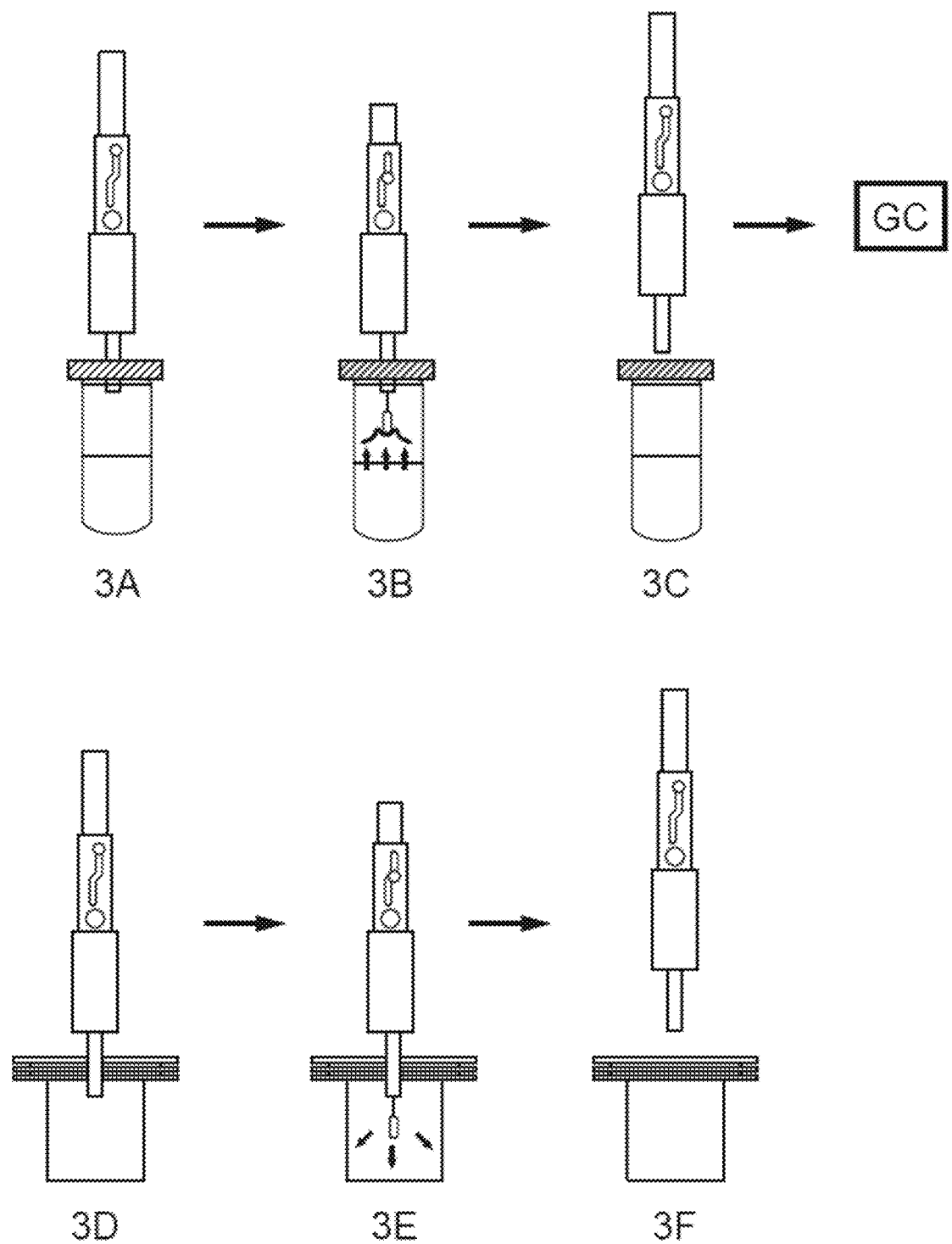
FIGS. 3A to 3F illustrate the extraction and desorption procedures in SPME-GC/MS measurements.

FIGS. 3A to 3F illustrate the SPME fibre assembly, and the extraction and desorption procedures. FIG. 3A shows piercing of the sample septum. FIG. 3B shows exposure of the fibre and extraction. FIG. 3C shows retraction of the fibre and removal. FIG. 3D shows piercing of the GC inlet septum. FIG. 3E shows exposure of the fibre and desorption. FIG. 3F shows retraction of the fibre and removal.

Samples were added to the vial with water, and the total volume was 5 ml. The sample was first stabilized at 80° C. for 30 minutes (1). The compounds to be detected were adsorbed to the fibre while keeping the sample at 80° C. for 30 minutes (2). The compounds were desorbed from the fibre in GC injector (3) and led to GC column with a carrier gas. For the semi-quantitative analysis of guaiacol, dimethyl sulphide (DMS), dimethyl disulphide (DMDS) and dimethyl trisulphide (DMTS), calibration curves were determined by using water as a solvent.

Liquid Sample Analysis by GC/MS

Figure 4:
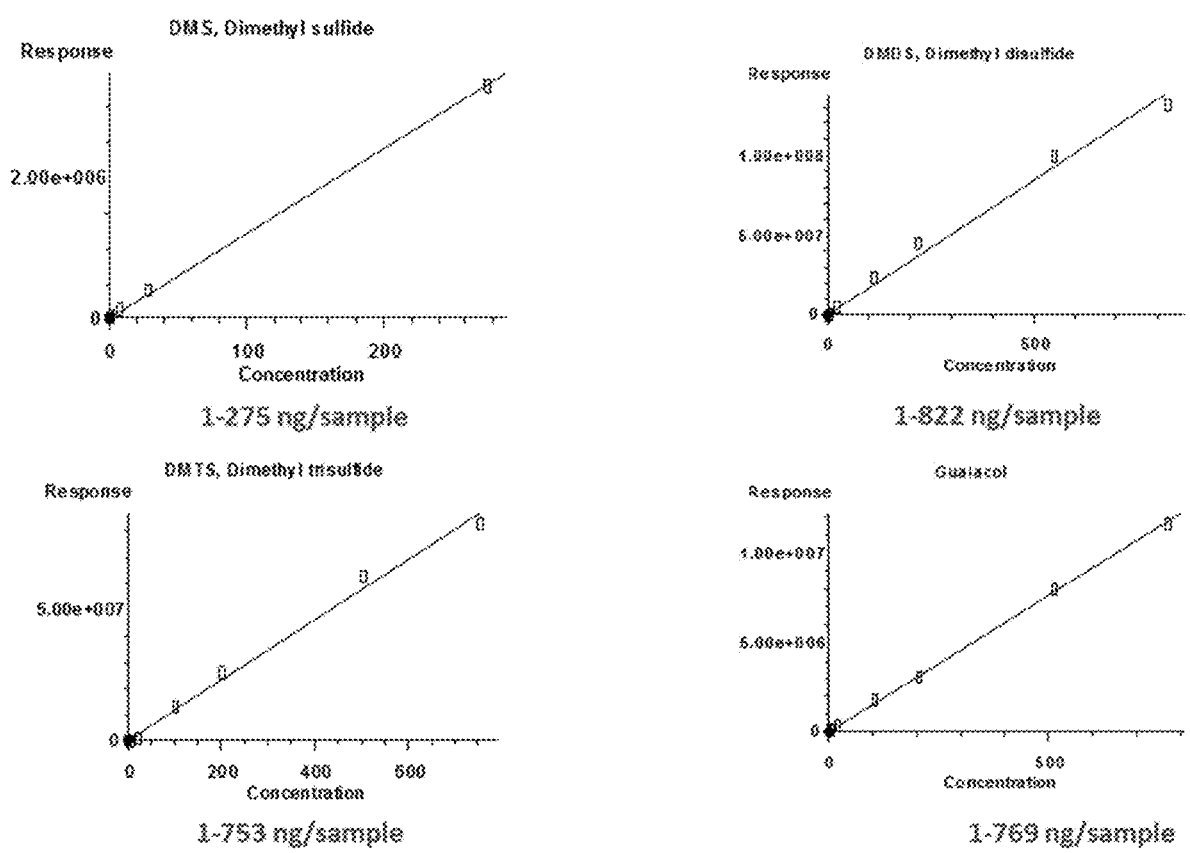
FIG. 4 shows the calibration curves for DMS, DMDS, DMTS and guaiacol.
Figure 5:
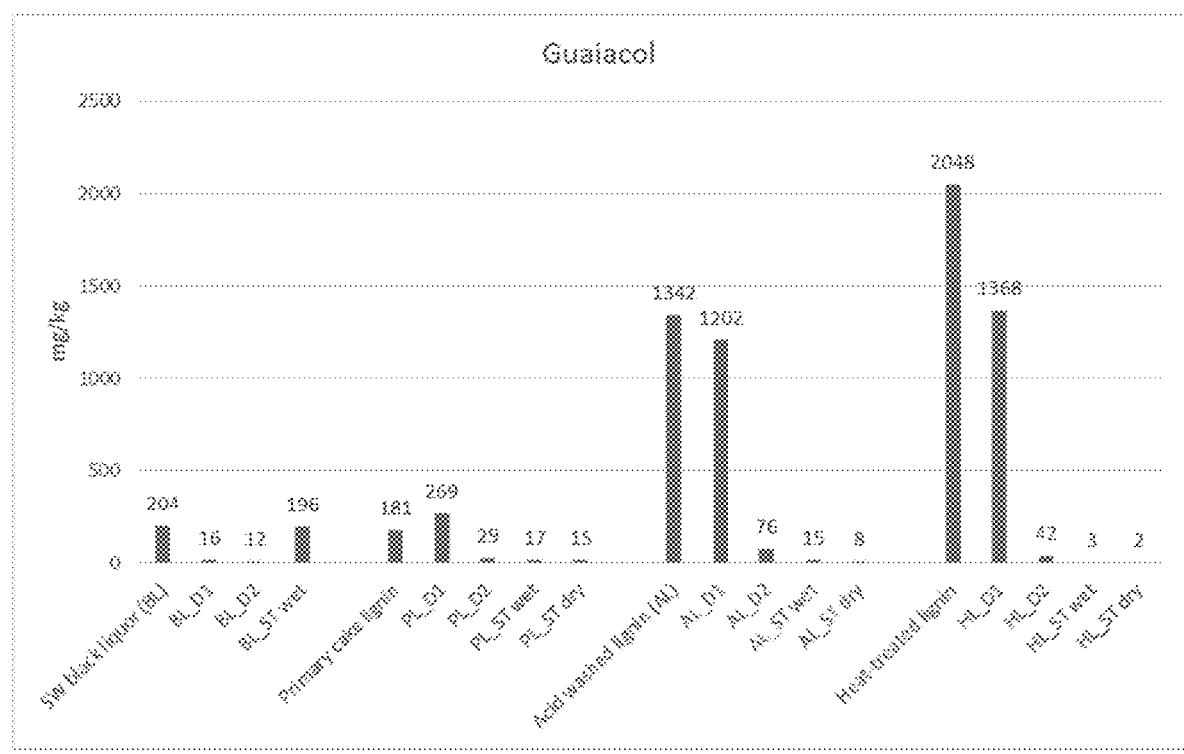
FIG. 5 shows the results of SPME-GC/MS analysis of guaiacol from lignin-containing samples.
Figure 6:
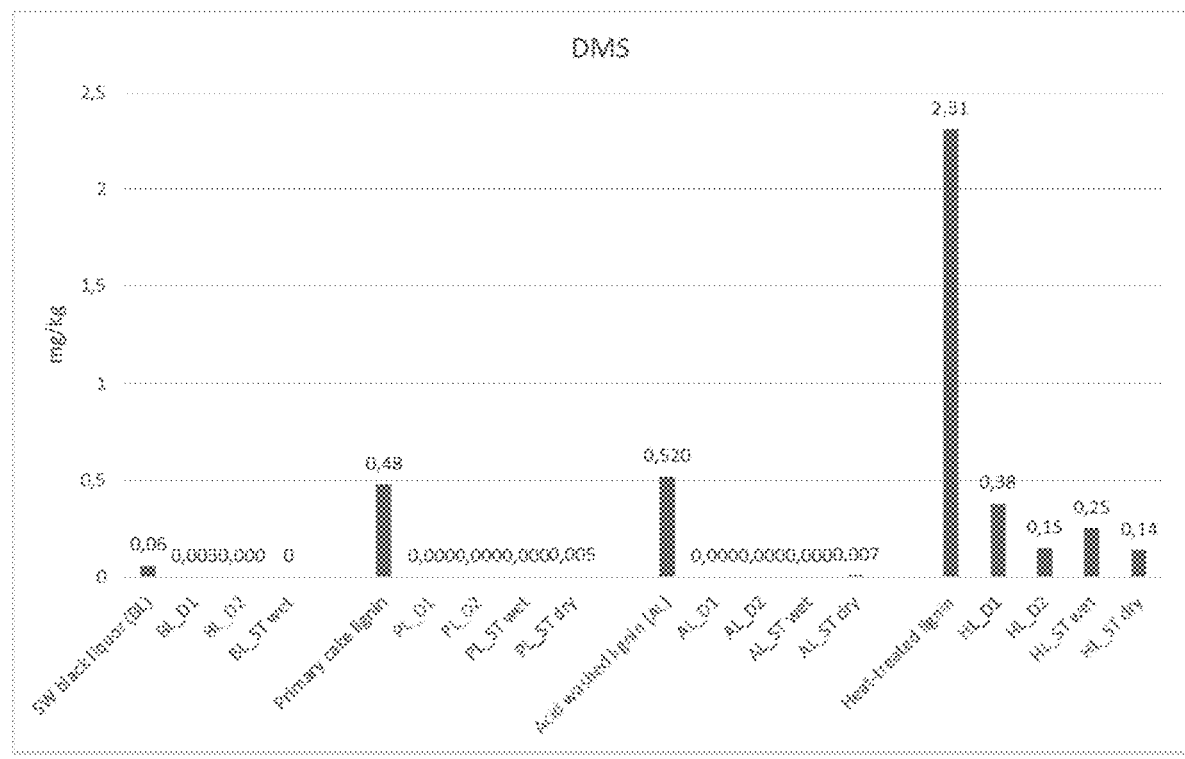
FIG. 6 shows the results of SPME-GC/MS analysis of dimethyl sulphide from lignin-containing samples.
Figure 7:
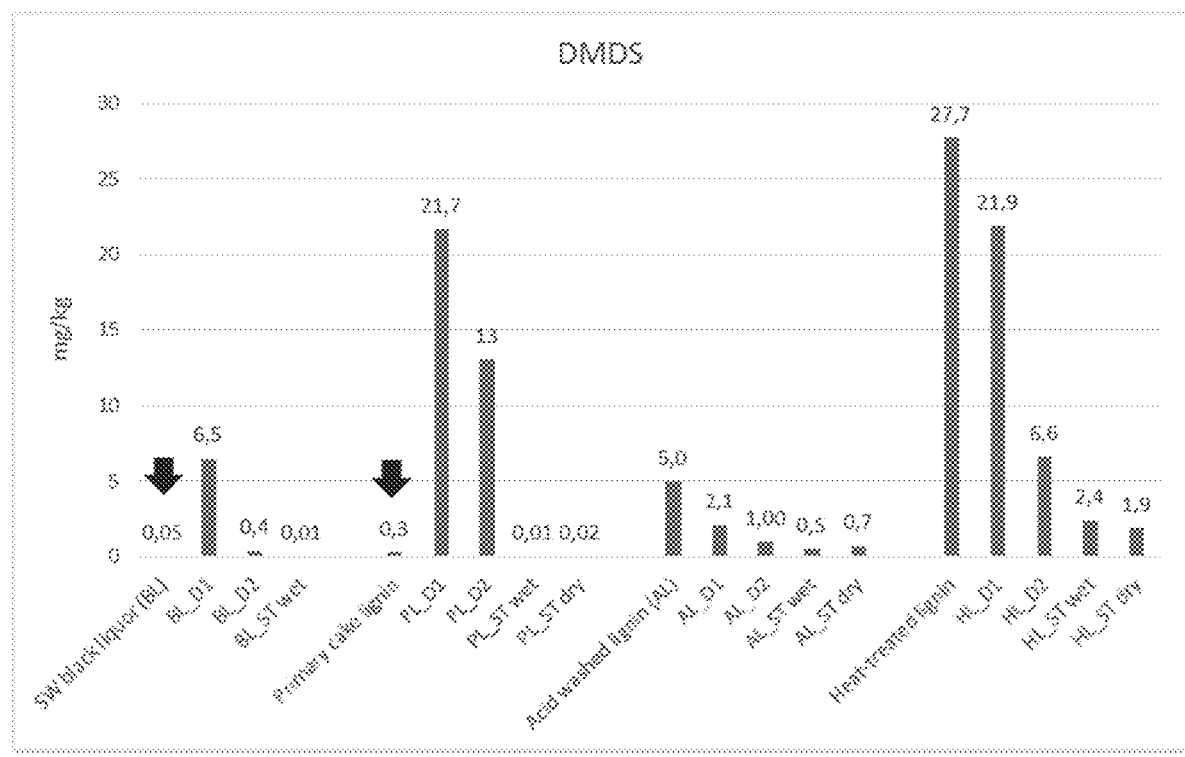
FIG. 7 shows the results of SPME-GC/MS analysis of dimethyl disulphide from lignin-containing samples.
Figure 8:
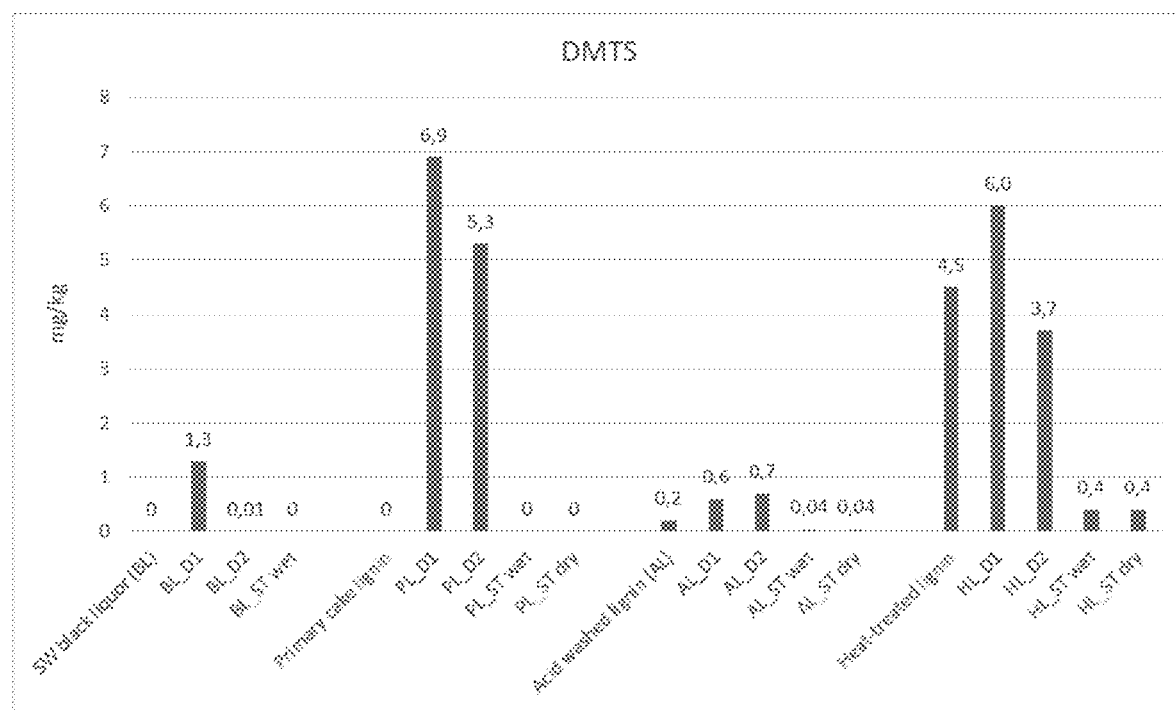
FIG. 8 shows the results of SPME-GC/MS analysis of dimethyl trisulphide from lignin-containing samples.

Guaiacol, dimethyl sulphide (DMS), dimethyl disulphide (DMDS) and dimethyl trisulphide (DMTS) were determined directly from the distillate by GC/MS. For the semi-quantitative analysis, calibration curves (shown in FIG. 4) were determined by using ethanol and/or water as a solvent.

Results

FIGS. 5 to 8 show the results of SPME-GC/MS analyses of guaiacol, DMS, DMDS and DMTS concentrations in the lignin-containing samples in the form of bar charts.

Table 3 also gives the results of the SPME-GC/MS analyses.

TABLE 3

| | SPME | | | |
|---|---|---|---|---|
| | DMS | DMDS | DMTS | Guaiacol |
| | mg/kg (original sample taken to ST) | | | |
| Odour threshold value, mg/kg | 0.001 | 0.005–0.0076 | 0.0002 | 0.003–0.021 |
| SW black liquor (BL) | 0.06* | 0.05* | No value | 204 |
| BL_D1 | 0.003 | 6.45 | 1.35 | 16 |
| BL_D2 | 0.000 | 0.40 | 0.01 | 13 |
| BL_ST wet | No value | 0.01 | No value | 196 |
| Primary cake lignin (PL) | 0.5 | 0.3 | No value | 181 |
| PL_D1 | 0.000 | 21.7 | 6.9 | 269 |
| PL_D2 | 0.000 | 13.0 | 5.3 | 29 |
| PL_ST wet | 0.000 | 0.01 | No value | 17 |
| PL_ST dry | 0.05 | 0.02 | No value | 15 |
| Acid washed lignin (AL) | 0.5 | 5.0 | 0.2 | 1342 |
| AL_D1 | 0.000 | 2.1 | 0.6 | 1202 |
| AL_D2 | 0.000 | 1.0 | 0.7 | 76 |
| AL_ST wet | 0.000 | 0.5 | 0.04 | 15 |
| AL_ST dry | 0.1 | 0.7 | 0.04 | 8 |
| Heat-treated lignin (HL) | 2.3 | 27.7 | 4.5 | 2048 |
| HL_D1 | 0.4 | 21.9 | 6.0 | 1368 |
| HL_D2 | 0.1 | 6.6 | 3.7 | 42 |
| HL_ST wet | 0.3 | 2.4 | 0.4 | 3 |
| HL_ST dry | 0.1 | 1.9 | 0.4 | 2 |

It was observed that the amount of guaiacol, DMS, DMDS and DMTS was significantly lower in the lignin samples after the steam treatment. The leaching of guaiacol was more significant than the leaching of DMS, DMDS and DMTS. Most of the leaching took place during the first distillation stage, i.e. the amounts determined in the distillate D1 were larger than the ones determined in the second distillate D2 (D1>D2).

Table 4 shows mass balance between the original and distillate (D1+D2)+steam treated (ST) samples.

TABLE 4

| | SPME | | | |
|---|---|---|---|---|
| | DMS | DMDS ppm | DMTS | Guaiacol ppm |
| SW black liquor (BL) | 0.06 | 0.05 | 0.00 | 204 |
| D1 + D2 + ST wet | 0.003 | 6.86 | 1.36 | 225 |
| Primary cake lignin (PL) | 0.5 | 0.3 | 0.0 | 181 |
| D1 + D2 + ST wet + ST dry | 0.05 | 34.7 | 12.1 | 331 |
| Acid washed lignin (AL) | 0.5 | 5.0 | 0.2 | 1342 |
| D1 + D2 + ST wet + ST dry | 0.1 | 4.2 | 1.4 | 1302 |
| Heat-treated lignin (HL) | 2.3 | 27.7 | 4.5 | 2048 |
| D1 + D2 + ST wet + ST dry | 0.9 | 32.8 | 10.6 | 1415 |

Table 5 shows a comparison of the SPME and liquid GC/MS analysis results. In most samples no value was obtained for DMS and DMTS by liquid injection due to the low concentration. It was observed that SPME is a much more sensitive method than liquid injection.

TABLE 5

| | DMS | | DMDS | | DMTS | | Guaiacol | |
|---|---|---|---|---|---|---|---|---|
| | SPME | Lq (EtOH[1]) | SPME | Lq (EtOH[1]) | SPME | Lq (EtOH[1]) | SPME | Lq (EtOH[1]/water[2]) |
| BL_D1 | 0.00 | 0.00 | 6.5 | 5.6 | 1.35 | 1.15 | 16 | 15[1] |
| BL_D2 | 0.00 | 0.00 | 0.4 | 1.6 | 0.01 | 0.25 | 13 | 16 |
| PL_D1 | 0.00 | 0.00 | 21.7 | 17.0 | 6.88 | 0.00 | 269 | 343[1] |
| PL_D2 | 0.00 | 0.00 | 13.0 | 6.9 | 5.26 | 0.00 | 29 | 36 |
| AL_D1 | 0.00 | 1.88 | 2.1 | 0.00 | 0.59 | 0.00 | 1202 | 1342[2] |
| AL_D2 | 0.00 | 0.00 | 1.0 | 0.00 | 0.70 | 0.00 | 76 | 94 |
| HL_D1 | 0.38 | 0.00 | 21.9 | 7.1 | 6.03 | 0.00 | 1368 | 1799[2] |
| HL_D2 | 0.15 | 0.00 | 6.6 | 3.7 | 3.66 | 0.00 | 42 | 15 |

[1]Calibration standards in EtOH.
[2]Calibration standards mainly in water.

It can be concluded that the steam treatment leached odorous compounds effectively from the lignin samples, and that the removal of guaiacol was more pronounced than the removal of sulphur compounds.

Odour Release from Lignin at Elevated Temperatures

Release of guaiacol and sulphur compounds after treatment at elevated temperatures from steam-distilled lignin samples was studied. The release of guaiacol, dimethyl sulphide, dimethyl disulphide and dimethyl trisulphide was determined. The analysis gave information about the content of odorous compounds in the lignin samples before and after heating. In the following we a give a more detailed description of these experiments.

Two lignin samples, both after odour removal by means of steam distillation, were heat-treated and depicted as "softwood Heat-treated ST" (as HL ST above) and "acid washed lignin cake ST". Each lignin sample was treated separately in an inert atmosphere in a GC oven at 100° C., 180° C. or 260° C. for 30 minutes. The samples, and the references that were not heat-treated, were analysed quantitatively by Solid Phase Micro Extraction (SPME)-GC/MS for their volatile components including: guaiacol, dimethyl sulphide, dimethyl disulphide and dimethyl trisulphide.

Table 6 shows the results calculated for the analysed samples.

TABLE 6

| | DMS mg/kg | DMDS mg/kg | DMTS mg/kg | Guaiacol mg/kg |
|---|---|---|---|---|
| Heat-treated lignin ST | 0.23 | 5.3 | 1.5 | 5.2 |
| Heat-treated lignin ST 100° C. | 0.24 | 5.9 | 1.8 | 5.9 |
| Heat-treated lignin ST 180° C. | 0.00 | 0.77 | 0.73 | 3.2 |
| Heat-treated lignin ST 260° C. | 0.00 | 0.00 | 0.00 | 7.3 |
| Acid-washed lignin cake ST | 0.24 | 2.3 | 0.31 | 54.9 |
| Acid-washed lignin cake ST 100° C. | 0.24 | 2.3 | 0.26 | 48.5 |
| Acid-washed lignin cake ST 180° C. | 0.00 | 5.8 | 0.59 | 6.6 |
| Acid-washed lignin cake ST 260° C. | 56.5 | 24.3 | 6.8 | 48.4 |

After the heat-treatment at 100° C., no changes were observed in Heat-treated lignin ST and in Acid-washed lignin cake ST with regard to odour formation or structure.

After the heat-treatment at 180° C., in Heat-treated lignin ST we observed a reduction in DMS, DMDS, DMTS and guaiacol formation. The material was still in the form of separate particles, but its colour had darkened. In Acid-washed lignin cake ST we observed reduction in DMS and guaiacol formation. The colour of the material had darkened and its structure slightly hardened.

After the heat-treatment at 260° C., in Heat-treated lignin ST we observed a reduction in sulphur compounds DMS, DMDS and DMTS formation but a slight increase in guaiacol formation. The material was in the form of big aggregates and black in colour. In Acid-washed lignin cake ST we observed increased formation of sulphur compounds DMS, DMDS and DMTS, and also new sulphur compounds were identified. Guaiacol formation was at a similar level as before the heat-treatment. The sample swelled during the heat treatment and was black in colour after the heat-treatment.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in removal of odorous compounds from lignin-containing materials.

Acronyms List

DMS dimethyl sulphide
DMDS dimethyl disulphide
DMTS dimethyl trisulphide
SPME solid phase micro extraction
GC gas chromatography
MS mass spectrometry
SW softwood
BL black liquor
PL primary cake lignin
AL acid-washed lignin
HL heat-treated lignin
ST steam-treated

REFERENCE SIGNS LIST 10 steam stripping column
11a distillation plate
12 input of odorous lignin
13 injection of steam
14 output of dirty steam
15 output of purified lignin
20 steam generator
21 sample
22 distillate

The invention claimed is:

1. A method of removing volatile compounds from a lignin-containing material, the method comprising:
providing the lignin-containing material comprising lignin and the volatile compounds;
treating the material by a distillation method in order to vaporize at least a part of the volatile compounds,
wherein said treating step comprises steam stripping the lignin-containing material at a pressure not larger than 1.5 bar.

2. The method according to claim 1, wherein said treating comprises exposing the lignin-containing material to steam in order to vaporize at least a part of the volatile compounds.

3. The method according to claim 2, wherein, before exposure to the steam, said lignin-containing material comprises at least 100 mg/kg guaiacol of the dry matter of the lignin-containing material.

4. The method according to claim 2, wherein, before exposure to the steam, said lignin-containing material comprises at least 1000 mg/kg guaiacol of the dry matter of the lignin-containing material.

5. The method according to claim 1, wherein the volatile compounds comprise volatile odorous compounds.

6. The method according to claim 1, wherein the lignin-containing material is in the form of an aqueous suspension.

7. The method according to claim 1, wherein said volatile compounds comprise sulphides and/or guaiacol.

8. The method according to claim 1, wherein the lignin-containing material originates from a pulp production process and comprises lignin that has been precipitated from black liquor.

9. The method according to claim 1, wherein the lignin-containing material originates from a pulp production process and comprises lignin that has been precipitated from black liquor and thereafter acid washed.

10. The method according to claim 1, wherein the volatile compounds comprise volatile odorous compounds, and wherein the treating comprises exposing the lignin-containing material to steam at a temperature from 50 to 120° C. to vaporize at least a part of the volatile odorous compounds.

11. The method according to claim 1, further comprising:
before or during the treating step, forming an aqueous suspension or a moist paste of said lignin-containing material.

12. The method according to claim 1, wherein the volatile compounds comprise volatile odorous compounds, and wherein the method further comprises:

after or during the treating step, condensing the vaporized odorous compounds.

13. The method according to claim 1, wherein the lignin-containing material originates from a pulp production process.

14. The method according to claim 1, wherein the volatile compounds comprise sulphides, and wherein the sulphides are selected from the group consisting of dimethyl sulphide, dimethyl disulphide, dimethyl trisulphide, and combinations thereof.

15. The method according to claim 1, wherein the volatile compounds comprise guaiacol.

16. The method according to claim 1, wherein the method is carried out as a continuous process.

17. The method according to claim 1, wherein the treated lignin-containing material comprises less than 50 mg/kg of guaiacol of the dry matter dry matter of the lignin-containing material.

18. The method according to claim 1, wherein the treated lignin-containing material comprises less than 1 mg/kg of guaiacol of the dry matter of the lignin-containing material.

\* \* \* \* \*